Figure 1:
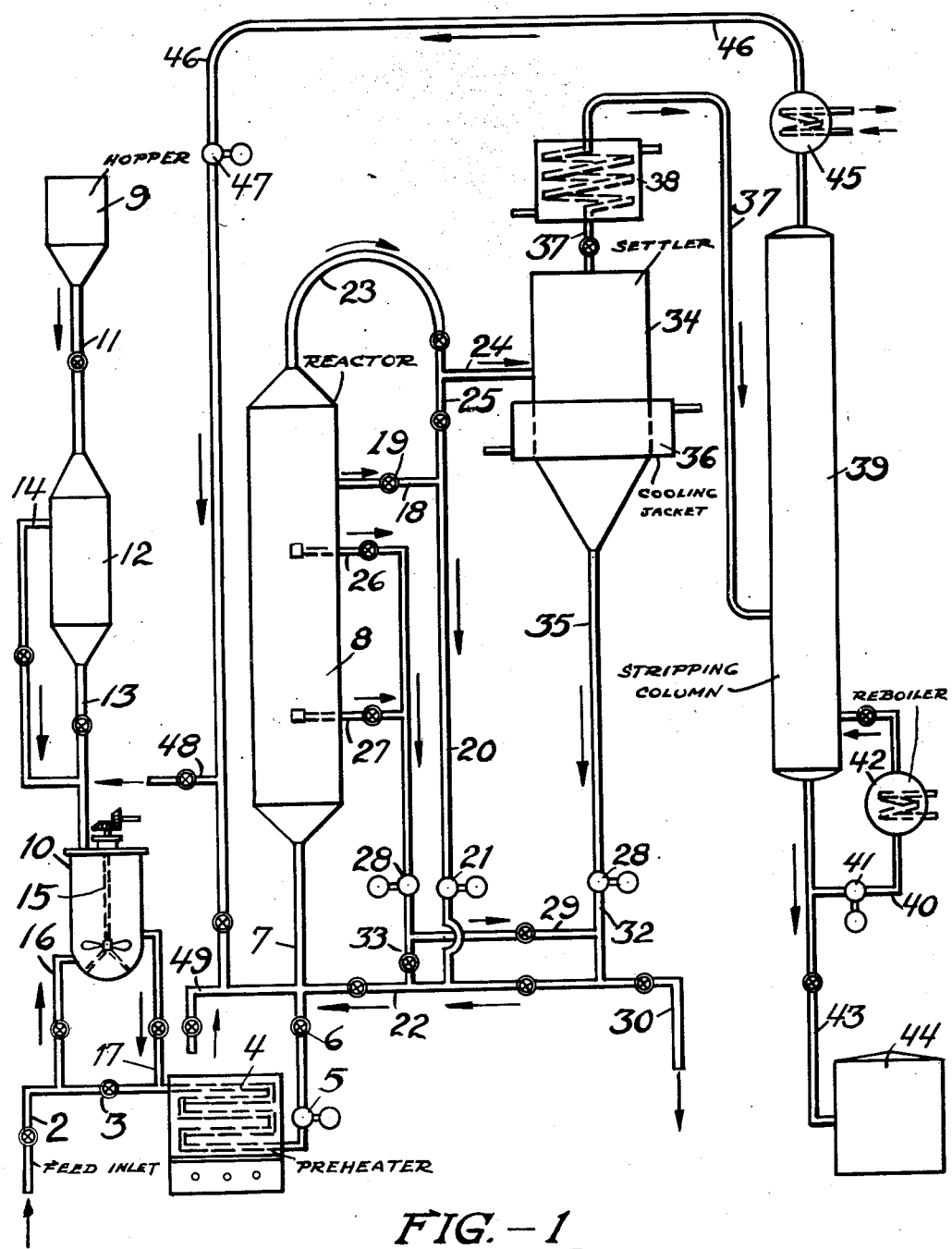

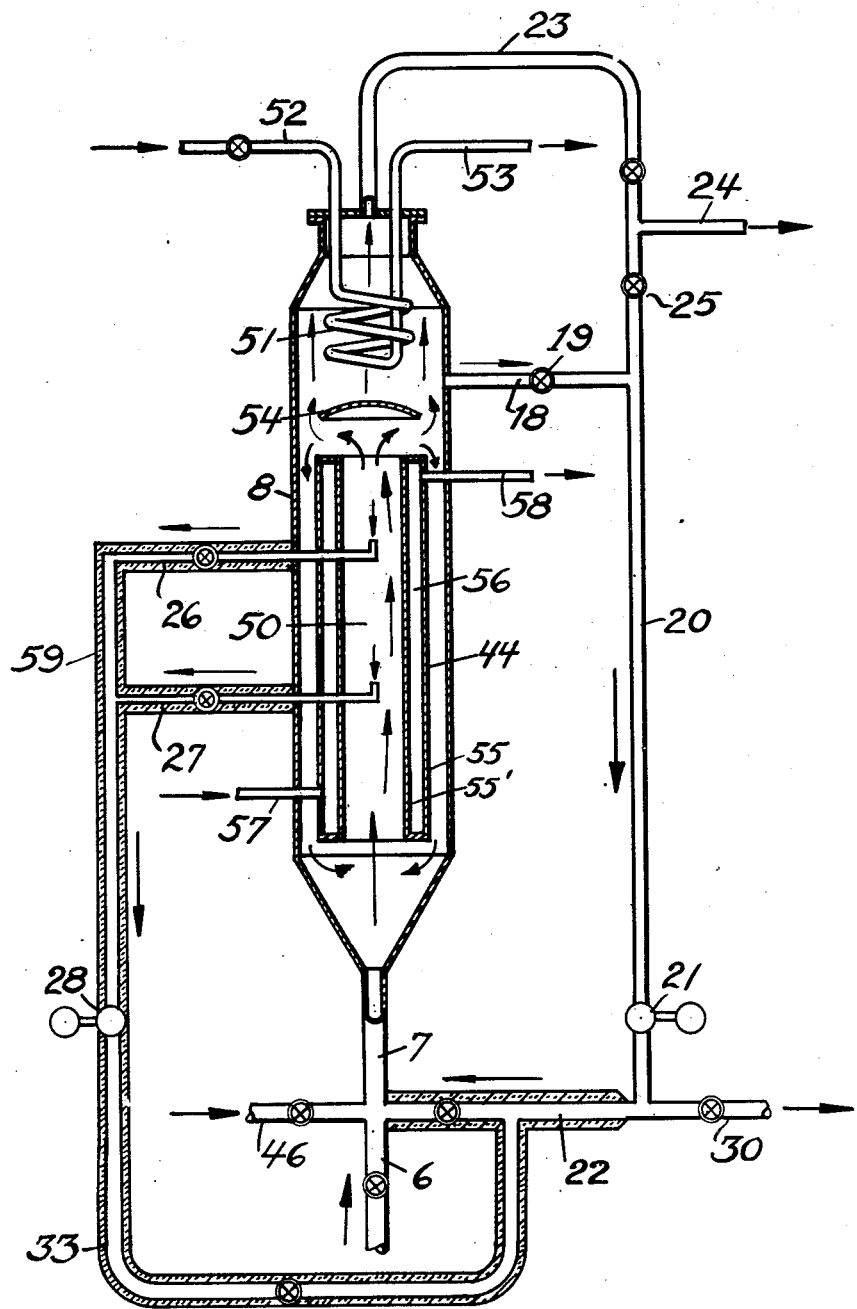

Patented Nov. 16, 1943

2,334,553

UNITED STATES PATENT OFFICE 2,334,553

APPARATUS AND PROCESS FOR CATALYTIC REACTIONS OF LOW BOILING HYDROCARBONS

Clarke T. Harding, Hillside, N. J., assignor to Standard Oil Development Company, a corporation of Delaware Application November 8, 1941, Serial No. 418,312

10 Claims. (Cl. 260—683.5)

This invention relates to a treatment of low boiling hydrocarbons in the liquid phase containing a suspended normally solid catalyst, and has the object of providing an improved apparatus and process for more efficient operation.

More particularly, this invention is concerned with isomerization and kindred treatments of low boiling hydrocarbons, especially those which are normally gaseous, to effect changes in their configurations with the aid of a catalyst suspended, or both dissolved and suspended, in the liquefied hydrocarbons under mild reaction conditions. For example, it has specific application in converting liquefied normal butane into isobutane or liquefied normal pentane into isopentane in the presence of various Friedel-Crafts type catalysts, such as aluminum chloride, aluminum bromide, ferric chloride, zinc chloride, and the like, used as such or on carriers, and either with or without the addition of promoters.

The improved technique provided by this invention facilitates continuous or intermittent liquid phase operations wherein low boiling hydrocarbons are treated or reacted at temperatures restricted to avoid substantial decomposition into lower molecular weight compounds and avoid carbonization.

Heretofore, various difficulties have been encountered in the heterogeneous catalytic liquid phase reactions of low boiling hydrocarbons, particularly with highly active solid catalysts which have tendencies to become separated from the reaction mixture and thereupon form undesirable sludge, polymers, and coked deposits. A segregation of these catalysts from the hydrocarbon liquids leads to the formation of undesirable by-products, causes clogging of apparatus parts with solid deposits, stoppage of lines, freezing of valves, fouling of heating surfaces, and, in general, jeopardizes the operability of the plant. These harmful effects arise when the catalysts become separated from the hydrocarbons outside as well as inside the reaction zone. As a consequence of these effects, a considerable amount of shutdown time is necessitated, for it has been noted that the separated catalyst particles tend to cake where deposited and subsequently coke when they become subjected to heat.

Ordinarily, it has been necessary to provide a reactor with a mechanical agitator for maintaining finely divided solid catalysts suspended in the liquid reaction mixture as much as possible, but it has been found that the operation can be made much more efficient if a mechanical agitator is dispensed with.

The present invention in a novel manner greatly reduces pumping of liquid hydrocarbons containing high concentrations of catalysts through pipe lines wherein conditions are conducive to catalyst separation, maintains the catalyst more effectively concentrated within the liquid reaction mixture under proper reaction conditions, obviates the necessity of the mechanical agitator, and thus greatly overcomes the obstacles to efficient operation.

In accordance with the present invention, the reaction mixture containing a controlled amount of catalyst suspended, or both suspended and dissolved, in a liquefied hydrocarbon reactant is made to pass upwardly through a vertically elongated reaction zone at a suitable velocity so that the finely divided solid particles of catalyst, and the total catalyst concentration as well, is highest in a central region of the reaction zone located in the lower part of a reactor; and under the force of gravity, this concentration is decreased through settling of particles, as the reaction mixture approaches the upper part of the reaction zone. By controlling the upward velocity of the reaction mixture, the concentration of the catalyst may be so diminished above the reaction zone to permit withdrawal of the treated hydrocarbons in liquid phase at points above the reaction zone and recirculation thereof back through the reaction zone or withdrawal thereof for recovery of the product with greatly diminished difficulties from segregation of catalyst. In this operation, the reactor is preferably entirely filled with the hydrocarbons in liquid phase, leaving no vapor space for sublimation and deposition of the volatile metal halide catalyst, the catalyst being at all times in contact with the liquefied hydrocarbons. With the reactor entirely filled by liquid, it is highly advantageous to avoid the use of a mechanical agitator.

A further novel feature which is very advantageous with the present technique of dispersing suspended solid catalyst through the upward velocity force of the reaction mixture counterbalanced by settling under gravity resides in the efficient use of a heat exchange apparatus disposed within the reactor above the reaction zone but kept substantially fully in contact with the liquid reaction mixture passed upwardly from the reaction zone. A cooler or chiller arranged in this manner is very effective for assisting in controlling the settling and return of the catalyst to the reaction zone, thus minimizing the catalyst content of liquid products which reach a relatively quiescent settling zone in the upper part of the reactor and withdrawal lines located above the reaction zone for removal of the products for recovery or recycling. By this cooling arrangement, the product leaving the reactor has a sufficiently diminished catalyst content to greatly reduce the chance of clogging pipes, pumps, or valves with which the circulated liquid reaction mixture comes into contact. By keeping the cooling or chilling surface of the heat exchange unit continuously in contact with the liquefied hydrocarbons, deposition of sublimed catalyst on the cooling surface is diminished, also. Moreover, recirculation of partially reacted hydrocarbons within the reactor is obtained by the cooling above the reaction zone so as to set up a downward flowing convection current of the cooled hydrocarbons along the reactor walls to where they merge with the stream from the feed inlet entering the reaction zone. Further advantages of the invention will be understood from the description and explanation of the accompanying drawings.

By way of example, isomerization of n-butane is satisfactorily performed at temperatures in the range of 100° F. to 300° F. under a pressure sufficient to maintain the butane in liquid phase with a suspended aluminum chloride catalyst in a concentration of between about 10% and about 125% by weight of the n-butane within the reaction zone, and with hydrogen chloride as a promoter, for example, added in a weight per cent of between about 2 and about 20%. Under these conditions the aluminum chloride to a small extent, less than about 3%, becomes dissolved in the hydrocarbon regardless of whether it is admixed by itself with the oil or deposited on a suitable solid carrier as, for example, adsorbent clays, activated charcoal, silica gel, diatomaceous earth, alumina gel, and the like. The liquid reactant containing an effective amount of suspended catalyst is subjected to reaction conditions for a period of about ½ hour to 25 hours, depending upon the degree of conversion desired and the temperature level employed. It is possible to obtain, say, 40% conversion of normal butane to isobutane at about 50% catalyst concentration by employing a reaction time of about 2 hours at about 200° F., or the same conversion may be obtained in 24 hours of contact at about 110° F.

Various other feed stocks may be employed in the present process as, for example, n-pentane and higher homologues, singly or in mixtures as, for example, in casinghead gasoline, refinery gases, petroleum ethers, and the like, having predominantly a normal paraffin content.

In general, with any of the feed stocks mentioned, a sufficient pressure is employed to maintain the hydrocarbons in liquid phase under the reaction conditions, thus superatmospheric pressures, from about 30 up to as high as 400 and 500 lbs./sq. in. gage, may be employed; and with gaseous promoters, the pressures may range up to about 1200 lbs./sq. in. The temperatures for the desired reactions are usually and preferably above the normal boiling points of the hydrocarbons but below their cracking temperatures, because advantages of the present process are obtained particularly in a synthesis of isomers or higher boiling products from the initial hydrocarbons. In any particular instance, the temperature and time of treatment depends partly upon the nature of the feed stock, the activity of the particular catalyst and promoters, the selectivity of these agents, their concentration, and degree of reaction desired.

In isomerizing liquefied normal pentane or treating higher homologues of normal butanes, in general, somewhat less drastic conditions are preferred, for example, temperatures in the range of about 75° F. to 200° F., with reduced amounts of catalyst and promoter, and a time of contact in the range of about ½ to 10 hours.

Although the reaction conditions given are intended to apply generally, it is necessary to correlate the different factors of the conditions to obtain optimum results, for example, if a milder temperature or a lower amount of the catalyst, or a less reactive catalyst, or a decreased amount of promoter is used, then a longer reaction time is required to obtain the desired yield.

It will be further understood by those skilled in the art that there are a number of modifications in the conditions of treatment to alter the character of the isomers or synthetic products formed in low temperature catalytic treatments conducted for the purpose of causing rearrangements in the molecules or synthesizing higher molecular weight hydrocarbon products.

Various promoters, e. g., anhydrous hydrogen chloride, other hydrogen halides, low molecular weight alkyl halides, such as methyl chloride or ethyl bromide and the like, or elemental chlorine, may be employed to accelerate the isomerization. Free hydrogen or relatively inert gases, non-reactive under the reaction conditions, e. g., nitrogen, methane, or ethane, may be employed to aid in suppressing cracking. Various normally solid hydrogenation catalysts, such as metallic iron, cobalt, nickel may be added in powdered form or supported on particles of inert or catalytic adsorptive materials, such as pumice, acid-treated clay, or activated alumina to promote the activity of hydrogen. The adsorptive materials used may be of the type having polymerizing activity, or may be used impregnated with agents having catalytic polymerizing effects, such as ortho phosphoric acid or metal salts of phosphoric acid.

For the sake of clarity, the process and means for accomplishing the process of the present invention will be described with reference to the drawings.

Fig. 1 in the drawings is a schematic view of a general plant set-up for carrying out the process as it will be explained in more detail with respect to the isomerization of liquefied normal butane.

Fig. 2 shows a sectional elevational view and structural details of a reactor embodying a variety of features which assist in attaining the objects of the invention.

With reference to Fig. 1, the hydrocarbon feed stock, e. g., liquefied n-butane, is introduced into the system by means of line 2, controlled by valve 3. The liquefied hydrocarbon is passed thru a preheater 4 and by means of pump 5 is introduced into the reactor injection line 7, the flow being regulated by valve 6.

At a convenient point prior to the introduction of the feed stock into the reactor 8, the normally solid catalyst material, e. g., one composed of or containing aluminum chloride, is admixed in a desired proportion with the liquefied hydrocarbon feed stock. This is shown to take place by supplying a powdered or comminuted solid catalyst to the hopper 9, whence the catalyst is passed to mixing chamber 10 by way of valve controlled passage 11, an intermediate chamber 12, and valve controlled passage 13 so as to prevent access of air to the mixer. Line 14 connects line 13 with chamber 12 for equalizing the pressure in the intermediate chamber with that in the mixer 10 so as to facilitate the flow of the catalyst into the mixer. The mixer 10 is provided with an agitator 15 driven by any suitable device. The catalyst is mixed with a stream of the feed stock which is made to flow thru line 16 from the main supply line 2 by partially closing valve 3 and opening the valve in line 16. The oil mixed with the catalyst is passed from the mixer 10 thru line 17 for confluence with the feed stock flowing thru the main supply line to the preheater 4.

The feed stock mixed with the catalyst is injected upwardly into the reactor 8 after being preheated to the reaction temperature or to a temperature in the neighborhood thereof, and is injected with a controlled upward velocity that allows the solid catalyst particles to settle so that the reaction mixture approaches the upper part of the reactor with a minimum amount of catalyst, e. g., less than about 5% while the lower portion of the reaction zone has a catalyst concentration of between about 25 and about 125%.

The upward velocity of the liquid reaction mixture is preferably controlled to bring about the condition that the highest concentration of the catalyst is in a zone only part of the way up in the reactor. This condition is brought about by adjustment of the velocity, although the specific velocity required depends upon the differences in density between the liquid hydrocarbon phase and the density of the catalyst particles. With a greater difference in this respect and with the catalyst particles being relatively larger and denser, the faster will the catalyst tend to settle; and thus a higher velocity is required to maintain the maximum concentration at a suitable distance above the feed inlet at the bottom of the reactor. For controlling the locus of the highest catalyst concentration, an operator of the plant may observe to what extent catalyst is carried over in the liquid reaction product withdrawn from the upper part of the reactor.

The materials flowing thru the reactor 8 may be given different rates of flow in different parts of the reactor so that the highest concentration of suspended catalyst is maintained very readily in the lower part of the reactor even with a high rate of recirculation. This may be accomplished, for example, by withdrawing the reaction mixture at a point partway down the reactor, e. g., by line 18 having a flow control valve 19 and recirculating the withdrawn liquid back to the feed inlet 7 of the reactor thru line 20 with pump 21 and line 22. In this case, the recirculation is made to increase the velocity in the lower part of the reactor without substantially affecting the flow velocity in the upper portion of the reactor above outlet 18. Thus, the amount of recycling may be varied to a considerable degree while products are withdrawn from the uppermost part of the reactor thru line 23 at any desired relatively slow rate and forwarded to subsequent units for recovery, e. g., thru line 24, or led past valve 25 into line 20 for recycling.

The maximum catalyst concentration and the level thereof in the reaction zone may be controlled further by withdrawing catalyst suspension at a suitable rate from the reaction zone through auxiliary lines as, for example, through valve controlled passages 26 or 27, or both, via pump 28, whence the concentrated catalyst suspension may be discharged from the system thru 30 via valve controlled line 29 and line 32, or whence the catalyst suspension may be recirculated to the reactor via valve controlled lines 33 and 22.

An auxiliary settler 34 is provided for receiving treated hydrocarbon liquids from reactor 8 withdrawn thru lines 23 and 24 as an additional precaution for making a separation of entrained catalyst. Slurry which settles out at the bottom of settler 34, may be returned to the reactor by line 35 via pump 28, line 32 and line 22, or be removed from the system thru withdrawal line 30 joined to line 32.

When the operation is going in a satisfactory manner, whereby the catalyst is kept almost in its entirety concentrated within the reaction zone occupying a restricted lower part of the reactor, so that the liquid products withdrawn from the upper part of the reactor above the reaction zone are substantially free of suspended catalyst, then the settler is used mainly to act as a safeguard against accidental entrainment. The contents of the settler may be kept cooled for removal of any entrained catalyst by heat absorption of a cooling medium in cooling jacket 36.

Hydrocarbon liquid products substantially freed of catalyst may be withdrawn from the upper part of the settler thru line 37, passed thru cooler 38 for further cooling, and be discharged into a stabilizer 39 in which conditions may be maintained to separate as overhead gaseous material, e. g., promoting agents which may be accompanied to some extent by vapors of products. For example, with normal butane and isobutane and hydrogen chloride introduced into the stabilizing tower, the conditions may be such to practically completely separate the hydrogen chloride from the higher boiling butane and isobutane. The hydrogen chloride may, however, contain appreciable quantities of iso- and normal butane. Heat may be added to the stabilizing tower by recycling the bottoms thru line 40 with pump 41 thru a reboiler 42, wherein the heat is added to the recycled liquid by indirect heat exchange with a suitable heating medium, such as steam or hot water. A final product may be removed from the base of tower 39 by line 43 to unit 44 for further processing, e. g., by a caustic and water wash, to remove any trace of catalyst or promoter, followed by a suitable fractionating operation for separating the products as desired.

Overhead gaseous material from the tower 39 may be recovered by being passed thru cooler 45 in line 46, to a compressor 47 for reintroduction into the reactor thru the injection line 7, and portions of this gaseous material may be withdrawn from the system thru valve controlled line 48. Additional gaseous promoting agents may be supplied thru inlet 49 for addition to the feed material as it is passed into the reactor thru the injection line 7.

In operating with the system described, the size of the solid catalyst particles may be varied considerably within a range from a fine powder capable of passing thru a 325 mesh screen up to granules of a size retained by a 10 mesh screen. After the rate of circulation and substantially constant reaction conditions have been suitably adjusted in the reactor, a final product may be withdrawn from the upper part of the reactor 8 at a substantially constant rate while the reaction mixture in the lower part of the reactor is made to flow at a substantially constant recirculation rate, the fresh feed materials being introduced into the reactor continuously at a relatively slow but sufficiently constant rate to replace the materials withdrawn from the system.

In the form of the reactor illustrated in Fig. 2, an elongated channel of restricted cross-sectional area 50 is disposed in the lower part of the reactor 8, and the reaction zone is mainly confined within this channel by keeping the maximum concentration of the catalyst located therein. The injected feed materials from injection line 7, admixed with any recirculated reaction products which may be led from the upper part of the reactor thru lines 18, 20, and 22 with the aid of pump 21 are forced to pass upwardly thru the reaction zone channel 50. Here again the upward velocity is controlled to effect a suitable rate of solid particle settling so that when the liquids are emerging from the upper part of zone 50, they contain very little suspended catalyst. As the liquids proceed from the upper part of the reaction zone toward the top of the reactor, they may be made to flow in contact with the cooling means 51, which may be in the form of a cooling coil having an inlet 52 and an outlet 53, and conveniently built into the reactor thru the reactor head for ready removal. Any other suitable type of heat exchange device for cooling may be provided at this place to serve as a cooler, and if cool surfaces in the upper part of the reactor become coated by catalyst deposits precipitated out of solution by too intensive cooling, the cooling fluid may be replaced by a warming fluid medium temporarily for redissolving the deposited catalyst.

At a point above the reaction zone channel 50, but below the points from which it is desired to withdraw liquid freed of suspended catalyst, a baffle 54 may be disposed within the reactor to retard the upward velocity of the reaction mixture and thereby further induce the catalyst to settle toward the bottom of the reactor.

The means for restricting the reaction zone may be in the shape of a cylinder 55, or concentric cylinders, 55 and 55' having closures at both ends to provide an intervening space 56 of annular cross-section for internal circulation of a heat exchange medium introduced by inlet 57 and removed through outlet 58 to aid in maintaining the desired reaction temperature. It may be mentioned, however, that in the moderate temperature isomerizing or synthesizing reactions particularly concerned with, the heat of reaction is low so that very little heating or cooling is required to maintain the desired reaction temperature. In the synthesis reactions for which the apparatus is adaptable, this cylindrical heat exchange element may be used for cooling rather than for heating, but to a lesser degree than the cooling desired at the upper part of the reactor. The optimum reaction temperature range in isomerizing normal butane within the reaction space is of the order of 150° F. to 250° F. and the preferred temperatures to be maintained in the upper part of the reactor are of the order of 20° F. to 100° F.

As indicated with reference to Fig. 1, catalyst slurry may be withdrawn at points in the reaction zone 50 through withdrawal lines at desired levels, as, for example, through line 26 or 27 for recycling or via pump 28 and line 33. This slurry may be sent to another reactor or withdrawn from the system by line 30, or be removed jointly with liquid from line 20 to another reactor through line 30. Any part of the used catalyst may be removed from the reaction system for recovery of the catalyst. However, catalysts among the types mentioned have long life and may be used for a long time, particularly in treating hydrocarbon charging stocks from which inhibiting or poisoning impurities have been removed, as, for example, olefins, high boiling hydrocarbons, and sulfur compounds in the isomerization reaction.

Transfer lines through which slurries of high catalyst concentration are conducted, as, for example, lines 26, 27, 29, 33, and 22, also, even lines 35, 32, 20, 30, etc., which carry liquids containing only small amounts of catalyst, may be thermally insulated or provided in addition with heating elements to maintain the liquids at a suitable temperature and avoid excessive cooling. This measure, however, is mostly applicable to the former, which are shown in the Fig. 2 as being covered by a heat insulation lagging 59, e. g., in the nature of asbestos, or the like.

It will be noted that one or more of the several specific features of construction described in connection with Fig. 2 may be utilized in the reactor for improving the operation in accordance with the present invention. Each is intended to aid in accomplishing the objects set forth, and their importance depends on the amount of control necessary for a specific set of conditions and specific materials taking part in the treatment. Further modifications and additional instrumentalities may be employed, if desired, or as needed, for example, flow meters, temperature recorders, automatic regulating devices for flow, pressure, and temperature control, look boxes or glass gauges for observing the amount of catalyst suspended in the circulated liquids, atomizing or spray nozzles for the reactor feed inlet, etc.

In the event, for expediency or increasing plant capacity, it is necessary to use a number of reactors, they may be arranged in parallel, series, or both in series and parallel flow, i. e., a plurality of reactors may receive fresh feed from a common header and products may be collected from all or any of the reactors while each reactor has its own recycling system, or in place thereof, partly treated products from one reactor may be passed to another reactor for further treatment. For the purpose of simplicity the descriptions have been confined to the operation of a single reactor, the operation of which applies generally to reactors in a parallel or series flow operation.

Having thus described the character and nature of the invention, it is to be understood that the invention is not to be limited by the specific examples given and is subject to modifications coming within the scope and spirit thereof as defined in the appended claims.

I claim:

1. A process for treating liquefied low boiling hydrocarbons with a normally solid catalyst suspension therein at elevated temperatures restricted to preclude substantial cracking, which comprises maintaining a maximum concentration of the suspended catalyst in a reaction zone, flowing the liquefied low boiling hydrocarbons carrying the suspended catalyst upwardly into said reaction zone under controlled velocity, to deplete the concentration of the catalyst in treated hydrocarbons emerging from said reaction zone, accumulating a liquid body of said treated hydrocarbons above said reaction zone, conducting a stream of said treated hydrocarbons with depleted catalyst content to a reaction zone wherein a maximum concentration of suspended catalyst is again built up for further treatment of the hydrocarbons.

2. A process for isomerizing a liquefied normal paraffin reactant with a suspended metal halide catalyst, which comprises injecting a stream of the liquefied hydrocarbon reactant containing the suspended catalyst upwardly into a reaction zone at a suitable velocity to maintain a maximum concentration of the catalyst in a restricted portion of said stream, controlling the upward velocity of the stream to deplete the catalyst concentration in liquefied hydrocarbons in said stream emerging to above the reaction zone, withdrawing from above the reaction zone a stream of said liquefied hydrocarbons depleted in catalyst content, and recycling said withdrawn stream to said reaction zone for further reaction in the presence of a maximum concentration of the catalyst in suspension.

3. A process for isomerizing liquefied normal butane with a catalyst comprising aluminum chloride at temperatures in the range from about 150° F. to 300° F. while said normal butane is maintained under sufficient pressure to remain in the liquid phase, which comprises flowing upwardly a stream of the liquefied normal butane containing the catalyst in suspension into a reaction zone at a controlled velocity to maintain a concentration of about 25% to 125% of catalyst within said zone and to deplete the concentration of the catalyst in liquefied hydrocarbons flowing from and upwardly beyond said reaction zone, accumulating a liquid body of normal butane and isobutane above said reaction zone, cooling said liquid body, withdrawing a portion of liquefied butanes from said liquid body for recovery of isobutane, and recycling another portion of said liquid body to said reaction zone for further isomerization.

4. A process for reacting liquefied normally gaseous hydrocarbons containing in suspension a finely divided solid catalyst at a temperature that precludes cracking of said hydrocarbons, which comprises injecting a stream of said hydrocarbons and catalyst in suspension upwardly into a vertically elongated reaction zone at a controlled upward velocity that imparts an upward motion to the suspended catalyst as the stream enters the reaction zone to a region in said zone where a maximum concentration of suspended catalyst is maintained, reducing the upward motion of suspended catalyst in said reaction zone, flowing reacted hydrocarbons in liquid phase upwardly from said reaction zone into an accumulated cooler liquid body of reduced motion in a settling zone wherein the concentration of suspended catalyst is substantially depleted, and withdrawing from said settling zone a liquid stream of reacted hydrocarbons substantially free of suspended catalyst.

5. A process as described in claim 4, in which a downward flowing convection current from said liquid body in the settling zone is merged with the stream of liquefied hydrocarbons and suspended catalyst entering the reaction zone.

6. A process as described in claim 4, in which a stream of suspended catalyst in liquefied hydrocarbons is removed from the reaction zone above the region where a maximum catalyst concentration is maintained.

7. A continuous process of isomerizing a liquefied normally gaseous straight chain paraffin in the presence of a suspended isomerizing catalyst, which comprises injecting a stream of the liquefied paraffin into a reaction zone with finely divided catalyst at a sufficient rate of flow to keep the catalyst suspended within said reaction zone and force liquefied paraffin remaining unchanged and those isomerized to emerge upwardly from said reaction zone substantially free of suspended catalyst into a relatively quiescent zone substantially filled by said unchanged and isomerized paraffins maintained in liquid phase, withdrawing a stream of liquefied paraffins from said quiescent zone for further treatment and recovery of isoparaffins at a rate of flow considerably lower than the rate of flow of the stream into said reaction zone, and recirculating to said reaction zone another stream of liquefied paraffins emerging from said reaction zone.

8. An apparatus for effecting a reaction of liquefied normally gaseous hydrocarbons with a suspended solid catalyst at a temperature restricted to preclude cracking of the hydrocarbons, comprising a vertically elongated vessel enclosing an upper settling section and a lower reaction section, a vertical partitioning structure in said lower section only forming a central vertical reaction channel leading to said upper section from a lower end entrance adjacent the base of the vessel, and forming a passageway with a wall of the vessel, said passageway being an open communication between said upper section and an entrance into the lower end of said central vertical channel, means for injecting liquefied hydrocarbons with suspended catalyst into the lower end of said channel to force an overflow of liquid from said channel into said upper settling section, means attached to the vessel for cooling said upper settling section, and means for withdrawing liquid from said upper settling section to outside the vessel.

9. An apparatus as described in claim 8, wherein said partitioning structure in the lower section of the vessel includes a conduit having inlet and outlet means communicating to outside the vessel for a heat exchange fluid.

10. An apparatus as described in claim 8, wherein means for withdrawing liquid from said upper settling section are outlet means at spaced points, one of said points being at the uppermost part of the vessel, and another of said points being intermediate the uppermost part of the vessel and the lower section of the vessel.

CLARKE T. HARDING.